Patented May 21, 1940

2,201,914

UNITED STATES PATENT OFFICE 2,201,914

FINISHING SYSTEM

Edmund F. Oeffinger, Aldan, and Harry G. Stauffer, Drexel Hill, Pa., assignors to E. I. du Pont de Nemours & Company, Wilmington, Del., a corporation of Delaware No Drawing. Application December 1, 1936, Serial No. 113,704. Renewed July 29, 1938

6 Claims. (Cl. 260—21)

This invention relates to finishing systems in general and more particularly to a decorative and protective finishing system for wood surfaces.

The finishing of wood surfaces such as furniture with protective and decorative coatings is carried out in a variety of ways in the present state of the art. The system used in finishing such surfaces comprises the steps of (1) staining, (2) filling, (3) sealing and (4) varnishing. The varnish according to present practice is usually sprayed onto the surface and from 1 to 3 applications are made, depending largely on the type and quality of article being finished. Each application or coating is dried at room temperature for usually from 18–48 hours before the application of a subsequent coating. The oleoresinous varnish used is prepared from treated drying oils and natural or synthetic resins. Cellulose derivative lacquers chiefly those of a cellulose nitrate base have displaced to some extent the oleoresinous varnishes as the finishing coating. In using these lacquers usually more coatings are necessary to give the required finish. The coatings may be dried at room temperature or forced dried at a temperature of between 100–110° F. Even with additional coats being necessary the use of the lacquer effects an economy in production due to the rapid drying of the material. So-called spirit soluble resins as shellac are often used to produce finishes on certain types of products. Synthetic resins such as the oil modified alkyd resins are used as finish coats in the same general system and these compositions may or may not be pigmented. Of the finishing systems which are in common use those giving the most desired results are tedious to operate and consequently rather expensive. An improved system which overcomes this general objection is highly desirable.

This invention therefore has as a principal object the provision of an improved system for finishing surfaces. A further object is the provision of compositions for finishing surfaces which will produce a finish having a high luster, will possess improved print resistance, increased resistance to alcohol and to water, will have increased depth of luster and produce a film which is tough and wear resistant and possess increased speed of drying. Other objects will be apparent from the description of the invention.

These and other objects are accomplished by the use of compositions comprising a urea-formaldehyde-alcohol resinous material, a plasticizer and a fossil resinous material which may be an unmodified fossil resin, that is a fossil resin used alone, or it may be a modified fossil resin comprising the fossil resin in combination with another resin.

As a preferred embodiment of the finishing composition the following example in which the parts are by weight is given:

Example I

| | Parts |
|---|---|
| Urea - formaldehyde - alcohol resin (65% solids) | 154 |
| Modified fossil resin solution | 100 |
| Pale blown castor oil | 50 |
| High solvency petroleum hydrocarbon | 103 |
| Phosphorous pentoxide solution | 3 |

On a solids basis this composition contains approximately 50% urea-formaldehyde-alcohol resin, 25% modified fossil resin and 25% plasticizer. The composition has the following characteristics:

| | |
|---|---|
| Viscosity E | Gardner-Holdt Scale |
| Color 3.4 | Hellige Color Comparator |
| Specific gravity | 0.956 at 25° C. |
| Solids content, approximately | 49% |

The urea-formaldehyde-alcohol resin is prepared by reacting in the presence of an acid or other catalyst (mercuric, aluminum, ferric, or stannic chlorides, acid resins, halogens, etc.) ingredients consisting solely or essentially of urea, formaldehyde, and a monohydric aliphatic alcohol. The heating of the reaction product of the urea and formaldehyde with the alcohol is continued in the presence of a hydrocarbon such as benzene or toluene with separation of water of reaction from the condensed hydrocarbon and return of the latter to the reaction mixture until substantially two molecules of water for each molecule of urea are eliminated and a product is obtained which contains an amount of combined monohydric alcohol equivalent from one-half to about one molecule of alcohol for each molecule of urea. In accordance with this procedure a mixture containing all the ingredients may be reacted, or the alcohol may be heated, accompanied by the mentioned separation of water, with preformed urea-aldehyde reaction product. With the use of some alcohols it may not be necessary to use in addition a hydrocarbon since the water may be satisfactorily removed by other means, as for instance by the use of silica gel in the separator, or by the use of an auxiliary fractionating column to separate the water from the alcohol before the latter is returned to the reaction vessel. These resins yield upon treatment with zinc chloride and acetic anhydride the acetate of the alcohol.

The following is a description of specific procedure that may be used in preparing the resin used in the foregoing example:

1600 parts by weight of aqueous formaldehyde containing approximately 37% of formaldehyde in solution are placed in a suitable container and 19 grams of sodium acid phosphate (NaH2PO4) added. The resulting solution is adjusted to a pH of 7.6 by the addition of a solution of sodium hydroxide, the amount required depending upon the acidity of the formaldehyde solution used. 540 parts by weight of urea are then dissolved in the formaldehyde solution and the mixture allowed to stand for approximately 96 hours, the temperature being maintained below 30° C., preferably between 20 and 30° C., by means of a cooling coil placed in the liquid or other suitable means. Crystallization of the reaction material sets in usually within from 12 to 24 hours and after a period of 96 hours the container will be found to contain a practically solid mass of crystals. The crystals are filtered and dried and a yield of about 85% of the theoretical available is obtained. This dried reaction product of urea and formaldehyde is used as the intermediate A in the next step of the process.

1500 parts by weight of isobutyl alcohol are placed in a still or reaction vessel. 100 parts by weight of toluol are then added, followed by the addition of 750 parts by weight of the intermediate product (A) referred to above and then 15 parts by weight of phthalic anhydride are added.

Heat is then applied to the reaction vessel and the distillation allowed to proceed at a fairly rapid rate. The liquid which is condensed in the condenser is passed into a separator where it separates into two layers with the organic solvent material forming the upper layer. This material is returned to the reaction vessel and the water layer discarded. Distillation is continued until substantially 2 molecules of water have been eliminated from the mass in the reaction vessel. The distillation is then continued beyond this point and the distillate not returned to the reaction vessel but removed from the separator as the water is in the early stage of the process. This continued distillation results in practically complete removal of water from the reaction vessel and also in a concentration of the solution in the reaction vessel. The urea-formaldehyde-alcohol reaction product may be prepared if desired by reacting, e. g., normal butyl alcohol, para-formaldehyde (which is brought into solution with a small amount of alkali as sodium hydroxide) and urea together with the necessary catalyst in the same or a similar apparatus as used in the first procedure described, the heating and distillation being carried out in the same manner.

The phosphorous pentoxide is prepared by dispersing 50 parts of phosphorous pentoxide in 100 parts of isobutyl alcohol.

In preparing the composition the various ingredients are mixed at room temperature (or what may be termed cold blending) preferably in the order as noted in the formula.

The modified fossil resin used in the above example is a combination of Congo gum and phenol-formaldehyde resin supplied to the trade as #1400 Beckopal. Other modified fossil resins such as macerated Congo resin modified with rosin esters may likewise be used. When this resin, or when run kauri, are used it is preferred to fuse the resins with the plasticizer, such as pale blown castor oil, to obtain the best compatibility. Examples of unmodified fossil resins are Congo and kauri.

The resin solution mentioned in the example is prepared by treating 400 parts by weight of #1400 Beckopal with 400 parts by weight of a high solvency petroleum naphtha and heating at the boiling point of the solvent with agitation. After the modified resin has been dissolved the solution is corrected to a 50% solids content by the addition of the necessary amount of the high solvency petroleum naphtha.

In place of the pale blown castor oil, which however is the preferred plasticized, other plasticizers may be used such as an extracted blown linseed oil known as Colloxin; blown linseed oil; magnesium treated coconut oil; hydrogenated castor oil phthalate; glycol, polyglycol, glycerol and polyglycerol esters of straight chain dicarboxylic acids as adipic, azelaic, succinic acid, etc.; chlorinated diphenyls; hydrogenated castor oil modified alkyd resin, linseed oil-Chinawood oil modified alkyd resin as well as other fatty oil or fatty oil acid modified alkyds, etc.

In place of the high solvency petroleum naphthas (which are usually hydrogenated petroleum hydrocarbons) there may be used aromatic hydrocarbons as benzol, toluol, etc., denatured ethyl alcohol, methanol, isobutyl alcohol, monoalkyl ethers of ethylene glycols and their esters, terpene hydrocarbon solvents, etc. The choice of the solvents will be readily apparent to those skilled in the art of preparing and using finishing compositions as described in the present invention and will be governed by conditions of application, economic factors, etc.

In place of the phosphorous pentoxide as an accelerator for drying the composition, ortho-phosphoric acid or oxalic acid may be used. These materials are preferably dissolved in a suitable alcohol although they may be added as such to the composition. The amount of accelerator used may conveniently vary between 0.25 and 5.0% based on the urea-formaldehyde-alcohol resin content of the composition.

In using the compositions as a finishing coat on, for example wood, the surface is stained and filled and then a thin coating of sealer applied. With the compositions of the present invention it is necessary to apply only about one-half the amount of sealer ordinarily used. After the sealer has been applied the finish composition is applied, preferably sprayed, in an amount sufficient to suitably cover the surface. The material is then placed in an oven and force dried at a temperature between 130 and 140° F. for a period of from 2-6 hours. It is then removed from the oven and cooled to room temperature after which the surface is rubbed and polished according to conventional procedures. Variations in the latter procedures will be readily apparent to those skilled in the finishing art and may be made to produce the degree of luster in the finish that may be desirable.

The range on a solid basis in the percentages of film forming ingredients in the preferred compositions is for the urea-formaldehyde-alcohol resin 40-75%, for the plasticizer 10-40% and for the fossil resinous material 10-50% which should contain not less than about 25% of fossil resin for the best results.

The finishing compositions may be used on metal, being applied over color coats or graining coats of pigmented standard finishes composition as orthodox compositions, synthetic resin compositions, etc. The finish may be conveniently baked for from 1-3 hours at 200-300° F. the time and temperature varying with the type of material being finished, type of finish desired, conditions available, etc.

It will be apparent from the description of the invention that we have developed a finishing system for wood, metal and other surfaces involving the use of a finish coat composition which produces a finish having a high luster, improved depth of luster which enhances the appearance of the grain in the wood, markedly improved alcohol and water resistance, improved print resistance and markedly improved toughness of film over the finishes now in common use. Further, since a smaller amount of sealer composition is necessary and since the finishing compositions may be dried and hardened in a much shorter time the system effects economic advantages over the best systems in the present state of the art.

As many apparently widely different embodiments of this invention may be made without departing from the spirit and scope thereof, it is to be understood that we do not limit ourselves to the specific embodiments thereof except as defined in the appended claims.

We claim:

1. A finishing composition comprising the resinous reaction product of urea, formaldehyde and monohydric aliphatic alcohol, a plasticizer, and a fossil resinous material, said resinous reaction product containing said alcohol in combined form in amount of from about one-half to about one molecule of alcohol for each molecule of urea, said product yielding upon treatment with zinc chloride and acetic anhydride the acetate of said alcohol.

2. A finishing composition which comprises the resinous reaction product of urea, formaldehyde and monohydric aliphatic alcohol, a plasticizer, and a fossil resinous material comprising fossil resin and phenol-formaldehyde resin, said resinous reaction product containing said alcohol in combined form in amount of from about one-half to about one molecule of alcohol for each molecule of urea, said product yielding upon treatment with zinc chloride and acetic anhydride the acetate of said alcohol.

3. A finishing composition which comprises the resinous reaction product of urea, formaldehyde and monohydric aliphatic alcohol, blown castor oil, a fossil resinous material, a high solvency petroleum hydrocarbon, and phosphorous pentoxide, said resinous reaction product containing said alcohol in combined form in amount of from about one-half to about one molecule of alcohol for each molecule of urea, said product yielding upon treatment with zinc chloride and acetic anhydride the acetate of said alcohol.

4. A finishing composition having the approximate composition of 40-70% resinous reaction product of urea, formaldehyde and monohydric aliphatic alcohol, 10-40% plasticizer, 10-50% fossil resinous material, and phosphorous pentoxide in amount of from 0.25 to 5% of the resinous reaction product, said resinous reaction product containing said alcohol in combined form in amount of from about one-half to about one molecule of alcohol for each molecule of urea, said product yielding upon treatment with zinc chloride and acetic anhydride the acetate of said alcohol.

5. A finishing composition comprising approximately 50% of the resinous reaction product of urea, formaldehyde and monohydric aliphatic alcohol, 25% of plasticizer, and 25% of fossil resinous material, said resinous reaction product containing said alcohol in combined form in amount of from about one-half to about one molecule of alcohol for each molecule of urea, said product yielding upon treatment with zinc chloride and acetic anhydride the acetate of said alcohol.

6. An article of manufacture having a surface coating thereon which comprises the resinous reaction product of urea, formaldehyde and monohydric aliphatic alcohol, a plasticizer, and a fossil resinous material, said resinous reaction product containing said alcohol in combined form in amount of from about one-half to about one molecule of alcohol for each molecule of urea, said product yielding upon treatment with zinc chloride and acetic anhydride the acetate of said alcohol.

EDMUND F. OEFFINGER.
HARRY G. STAUFFER.